United States Patent [19]

Yessian et al.

[11] Patent Number: 4,522,351
[45] Date of Patent: Jun. 11, 1985

[54] MOTOR DIFFERENTIAL DRIVE REEL TENSIONING SYSTEM

[75] Inventors: Richard J. Yessian, Martinsville; William A. Oetting, Green Brook, both of N.J.

[73] Assignee: Lockheed Electronics Company, Inc., Plainfield, N.J.

[21] Appl. No.: 537,579

[22] Filed: Sep. 30, 1983

[51] Int. Cl.³ .................... B65H 59/38; B65H 59/40
[52] U.S. Cl. ................................. 242/189; 242/190; 242/193
[58] Field of Search .............. 242/193, 194, 204, 190, 242/186, 75.44, 75.43, 57, 189, 75.51, 75.44, 75.5; 73/862.48, 862.64

[56] References Cited

U.S. PATENT DOCUMENTS

| | | | |
|---|---|---|---|
| 1,428,480 | 9/1922 | Giroux | 242/210 |
| 2,267,107 | 12/1941 | Juillard | 242/75.51 |
| 2,542,917 | 2/1951 | Fischer et al. | 242/75.5 |
| 2,656,129 | 10/1953 | Turk et al. | 242/190 |
| 2,937,816 | 5/1960 | Wood | 242/189 |
| 2,983,464 | 5/1961 | Fuller | 242/75.44 |
| 3,022,663 | 2/1962 | Diddens | 73/862.64 |
| 3,027,059 | 3/1962 | Streeter | 226/45 |
| 3,031,152 | 4/1962 | Cohen et al. | 242/75.51 |
| 3,240,281 | 3/1966 | Schaevitz | 73/862.64 X |
| 3,261,022 | 7/1966 | Glenn, Jr. | 346/151 |
| 3,289,961 | 12/1966 | Glenn, Jr. | 242/193 |
| 3,355,119 | 11/1967 | Johnson et al. | 242/204 |
| 3,363,852 | 1/1968 | Maxey | 242/193 |
| 3,386,681 | 6/1968 | Waterhouse et al. | 242/75.44 |
| 3,426,976 | 2/1969 | Maxey | 242/189 |
| 3,430,879 | 3/1969 | Boyer | 242/186 |
| 3,478,985 | 11/1969 | Tobey | 242/184 |
| 3,488,696 | 1/1970 | Klang | 242/190 |
| 3,497,154 | 2/1970 | Lasarev et al. | 242/75.44 |
| 3,561,699 | 11/1971 | Garrett | 242/193 |
| 3,606,201 | 9/1971 | Petusky | 242/190 |
| 3,679,215 | 7/1972 | Roberts et al. | 360/61 |
| 3,734,426 | 5/1973 | Howes et al. | 242/190 |
| 3,782,188 | 1/1974 | Korber et al. | 73/862.64 X |
| 3,858,828 | 1/1975 | Bundschuh et al. | 242/193 |
| 3,995,789 | 12/1976 | Carle | 242/193 |
| 4,145,016 | 3/1979 | Wiig | 242/193 |
| 4,347,993 | 9/1982 | Leonard | 242/75.44 X |
| 4,434,671 | 3/1984 | Yamashita et al. | 73/862.48 |
| 4,438,891 | 3/1984 | Wiig | 242/193 X |

FOREIGN PATENT DOCUMENTS 1276800 10/1961 France ............................ 242/55.12

Primary Examiner—Stephen Marcus
Assistant Examiner—Leo J. Peters
Attorney, Agent, or Firm—Hopgood, Calimafde, Kalil, Blaustein & Judlowe

[57] ABSTRACT

A tape tensioning device for tape recorder drive systems having first and second reels. A mechanical differential is disposed between the reels to permit counter rotation of the reels. A variable torque electrical motor is coupled to the differential for rotating same. An electrical sensor determines the tension in the tape and outputs a signal to servo-control circuitry. The servo-control circuitry varies the current to the differential drive motor, thus varying the torque applied to the differential drive means to maintain constant tension on the tape. The appropriate tape tension my be preset and adjusted to the appropriate value.

16 Claims, 4 Drawing Figures

MOTOR DIFFERENTIAL DRIVE REEL TENSIONING SYSTEM

BACKGROUND OF THE INVENTION

This invention relates to a tape tensioning drive system for tape recorders. More particularly, the invention is suitable for use in a tape tensioning system for use with tape recorders having coaxially mounted reels as used for data recording in applications where minimum size, weight and power is required. The system may also be used with non-coaxially mounted reels.

In such applications, it is necessary for the secure recording and retrieval of data that a constant tape tension be maintained across the recording and reproducing heads. Where coaxially mounted reels are used it is common to utilize negator springs to control the tension in the loop between the takeup and supply reels. However, such springs, because they are flexed, are subject to failure and thus limited in life. The springs require relatively large amounts of space and require different configurations and sizes as the tape lengths change. Furthermore, although the negator spring will supply the force to induce tension in the tape, it will be a function of the reel diameters. In such arrangements, the tape drive capstan motor must overcome the friction in the springs as well as the mass of the reels, thus increasing power requirements. Even with such springs other tensioning subsystems such as hysteresis brakes and tension arms are required at the head area to maintain constant tape tension.

While other techniques are known for controlling tape tension, such as variable pulley drives, such systems also introduce problems of their own which limit their usefulness. Certain systems utilize separate motors for each reel, which obviously results in added cost and complexity. Finally, previous systems using electrical devices to provide tape tension had difficulties when the system was unpowered. The present invention is directed to overcoming these difficulties.

Accordingly it is an object of this invention to provide an improved tape tensioning device for tape recorders.

It is another object of this invention to provide an improved tape tensioning device for tape recorders having coaxially mounted reels.

It is another object of this invention to provide an improved tape tensioning system that can provide varying amounts of torque to the reels.

It is another object of this invention to provide an improved tape tensioning device that is lightweight and compact.

It is a further object of this invention to provide a tape tensioning device that is independent of reel size and drive speed.

It is another object of this invention to provide an improved tape tensioning device that has low power consumption.

It is another object of this invention to provide an improved tape tensioning system using only a single reel drive motor.

It is another object of this invention to provide an improved electrical tape tensioning system that will provide tape tension even when the system is unpowered.

Still further objects of this invention will become apparent upon a reading of the detailed specification to follow.

SUMMARY OF THE INVENTION

A tape tensioning device for tape recorder drive systems having first and second reels. A mechanical differential is disposed between the reels to permit counter rotation of the reels at varying speeds. A variable torque motor is coupled to the differential for driving same. An electrical sensor determines the tension in the tape and outputs a signal to servo-control circuitry. The servo-control circuitry outputs a current in response to the tape tension signal output for varying the torque of the motor to maintain constant tension in the tape. The appropriate tape tension can be pre-set and may also be adjusted to any appropriate value.

BRIEF DESCRIPTION OF THE DRAWINGS

In order to better understand the invention, reference is made to the following drawings taken in conjunction with the detailed description of the preferred embodiments to follow.

DESCRIPTION OF THE PREFERRED EMBODIMENTS

Figure 1:
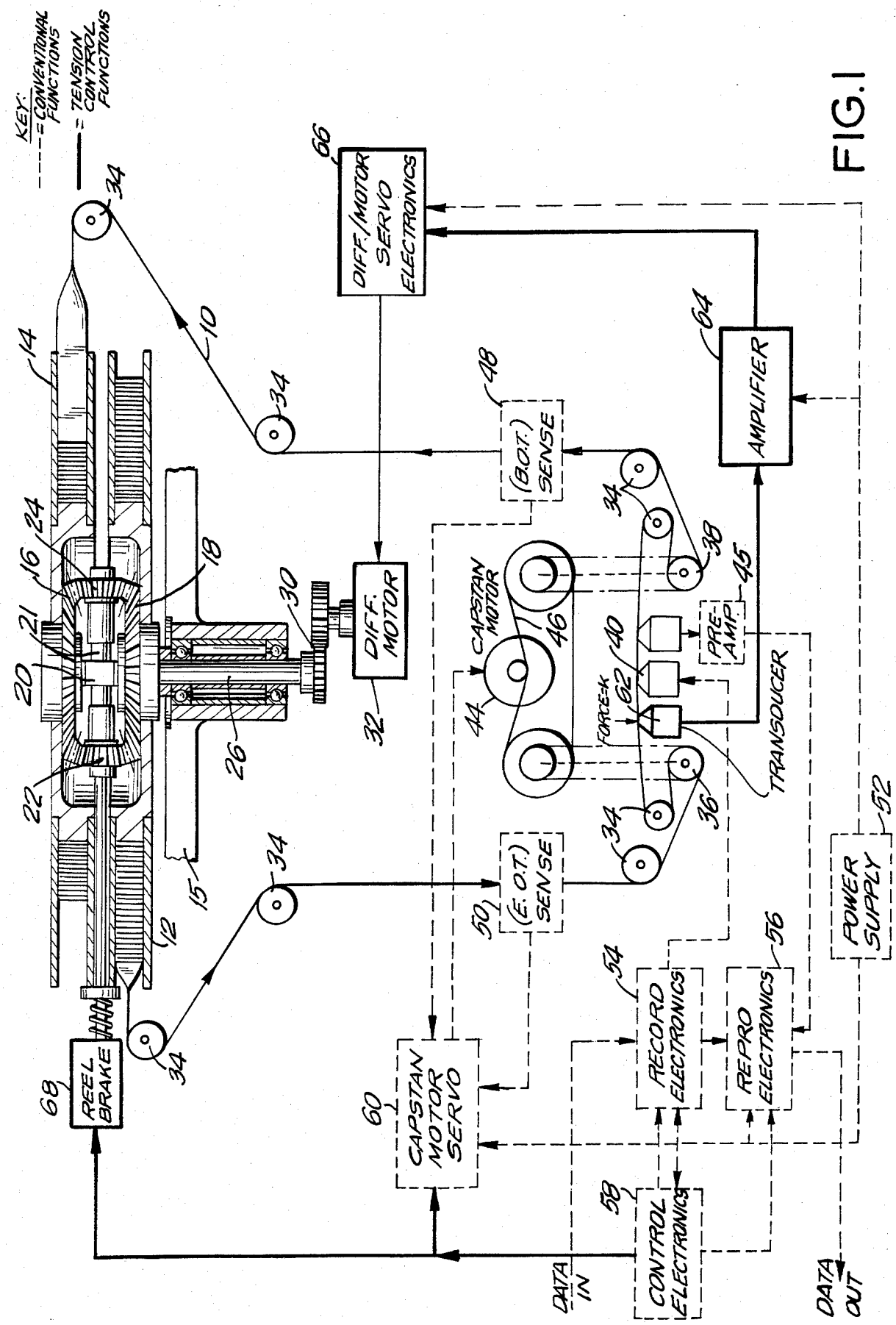
FIG. 1 is a diagram of the reel drive system and tape tension control system.

FIG. 1 illustrates the differential drive reel tensioning system of the invention. A web of magnetic tape 10 is wound from a supply reel 12 to a takeup reel 14. Supply reel 12 and takeup reel 14 are coaxially rotatably mounted above a base 15 with takeup reel 14 disposed above supply reel 12. The underside of takeup reel 14 includes a bevel gear 16 and the upper portion of supply reel 12 includes a bevel gear 18. Disposed between reels 12 and 14 is a differential carrier 20 having a shaft 21 rotatably mounting opposed spider gears 22, 24 which engage bevel gears 16, 18. Differential carrier 20 is rotatably mounted to a shaft 26 which extends through base 15. Shaft 26 is driven either directly or through gears 30 by a differential drive motor 32. Bevel gears 16, 18; differential carrier 20; and shafts 21, 26 thus form a mechanical differential to permit reels 12 and 14 to rotate in different directions at varying speeds.

The tape web 10 winds about a number of idler pulleys 34 which position the tape about capstans 36, 38 disposed on either side of a recording (write) head 40 and a reproducing (read) head 42. Capstans 36, 38 are driven by a capstan motor 44 via a belt 46. The web of tape 10 is wound from supply reel 12 through pulleys 34 about capstans 36 and 38 and back to takeup reel 14. As web 10 is driven via capstans 36, 38; reels 14, 12 will rotate in opposite directions at varying speeds depending on the amount of tape on each of the reels. As will be disclosed in detail below, the differential carrier 20 is rotated by motor 32 to maintain constant tension on the tape throughout its winding process. The beginning of the tape (BOT) is sensed by a beginning of tape sensor 48 and the end of the tape (EOT) is sensed by an end of tape sensor 50.

A power supply 52 is used to supply power to the various motors and electronics of the drive unit. Recording head 40 is coupled to record electronics 54 which is under the control of the control electronics 58. Reproducing head 42 is coupled through a pre-amp 44 to reproducing electronics 56. Naturally, electronics 54, 56 are adapted to receive and output data respectively, as indicated by "DATA IN" and "DATA OUT" in FIG. 1. Capstan motor 44 is under control of the capstan servo-electronics 60 which are also connected to beginning of tape sensor 48 and end of tape sensor 50.

Also disposed between capstans 36 and 38 is a force or tape tension transducer 62 having an electrical output coupled to the input of a tape tension amplifier 64. The output of amplifier 64 is coupled to the input of differential motor servo-electronics 66 to control differential drive motor 32. A reel brake 68 acts upon the edges of reels 12, 14 under the control of control electronics 58. The electronics relating to the tape tension sensor, the differential motor control circuitry, and the reel brake will be discussed in detail below.

Figure 2:
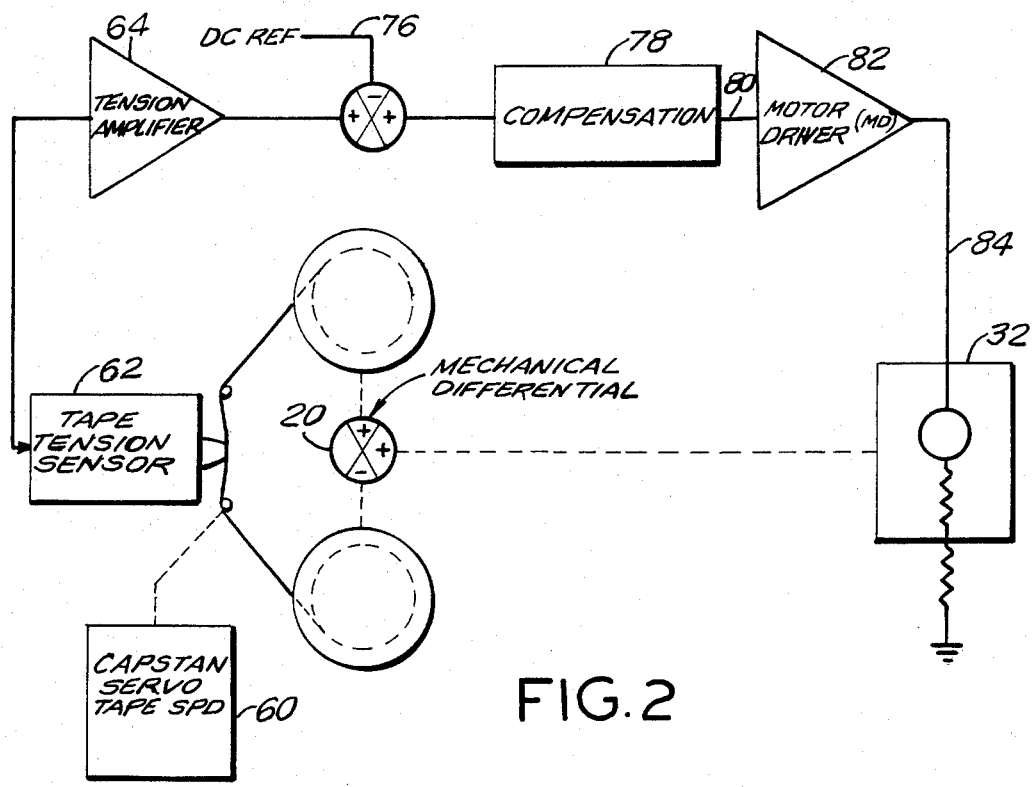
FIG. 2. is a block diagram of the tape tension control system.

FIG. 2. is a block diagram of the tape tension control system. The output of tape tension sensor 62 is connected to tension amplifier 64 which outputs a signal 72 representing the tension in the tape. Signal 72 is compared with a DC reference voltage 76 and a loop compensation circuit 78 outputs a DC signal 80 to motor driver circuitry 82 which in turn outputs a varying current to differential drive motor 32 to apply the appropriate torque to differential 20 to provide the appropriate tape tension. A suitable motor 32 for this application is a variable torque motor such as a Inland DC torque motor Type T-19110, of course any other suitable variable torque motor may be used. Motor 32 rotates in either direction depending upon the polarity of its input. An embodiment of the tape tension electronics will now be described in detail.

Figure 3:
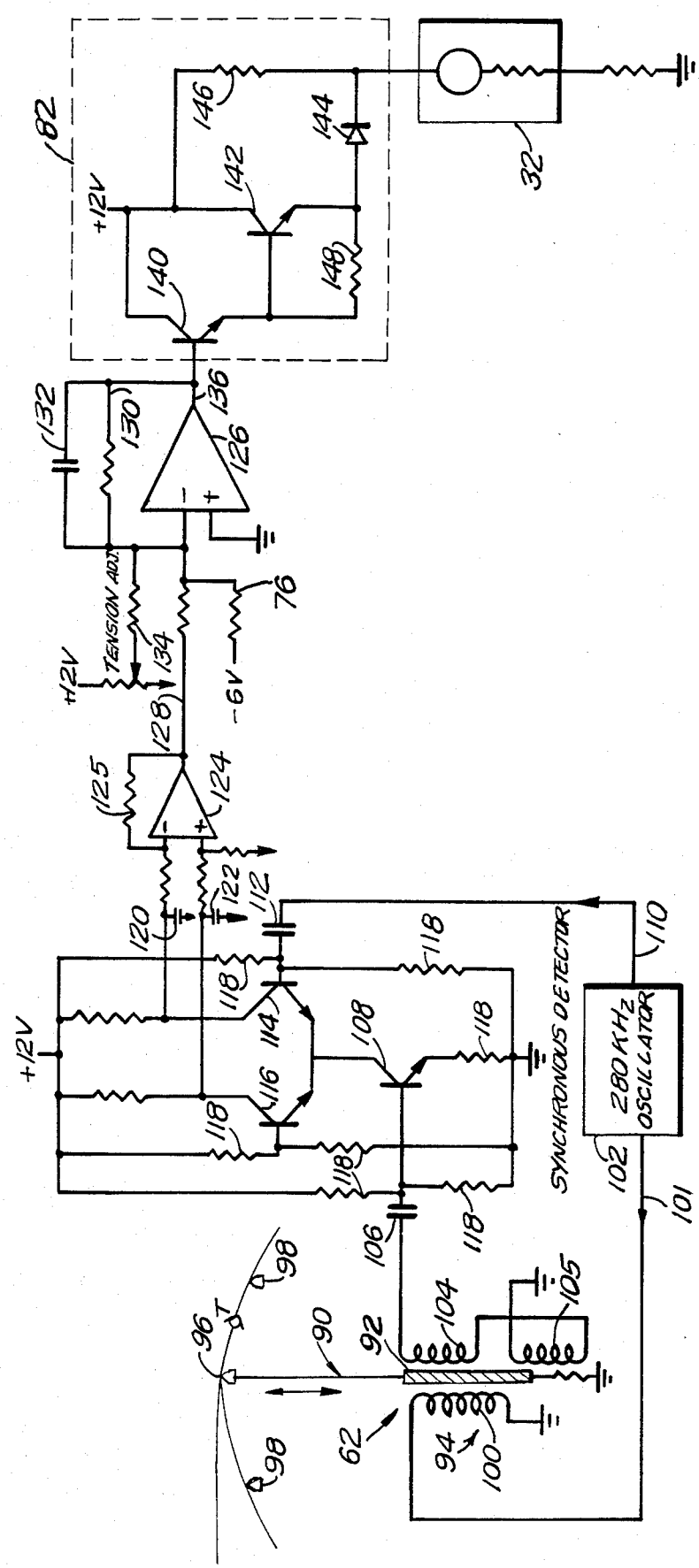
FIG. 3 is a schematic diagram of the tape tension control system.

FIG. 3 is a schematic diagram of the tape tension servo electronics. Tape tension sensor 62 is a commercially available item and consists of a spring loaded plunger 90 one end of which includes a rod of magnetic material 92 forming a transformer core which slides within a differential transformer 94. The other end of plunger 90 has a tape contact element 96 of artificial ruby material which is positioned between two fixed guides 98, also of artificial ruby material. Plunger 90 is arranged so that when there is zero tape tension, plunger 92 moves to the beginning of its travel. As the tape is tensioned, the plunger moves within the magnetic coils. The amount of tape tension determines the degree of travel of plunger 90. The amount by which contact element 96 extends beyond fixed guides 98 may be set by the user to any appropriate amount.

The primary coil 100 of differential transformer 94 is connected to a first output 101 of an RC oscillator 102. The secondary coil 103 has a first half 104 and a differentially connected second half 105. As plunger 90 travels, magnetic material 92 will differentially couple primary 100 to secondary halves 104, 105. First half 104 of secondary coil 103 of the tension transducer 62 formed by differential transformer 94 is connected through a coupling capacitor 106 to the base of a transistor 108 forming a synchronous detector to amplitude and phase detect the output of differential transformer 94. The second half 105 of secondary coil 104 is grounded. Another oscillator output 110, which is 180° out of phase with the output to the primary of transformer 94, is connected through a coupling capacitor 112 to the base of a transistor 114 which is connected in a differential configuration with a transistor 116. Various biasing resistors 118 are included in the circuitry to provide appropriate bias levels to the transistors.

Suitable operating parameters for oscillator 102 are 20 Vp-p at 280 KHz. Of course any other suitable output parameters may also be used. Plunger 90 is positioned so that at zero tape tension the coupling to the two halves 104, 105 of secondary coil 103 of transducer 62 is equal and the differential output is zero. When plunger 92 moves in 0.005 inches (corresponding to 3.5 ounces of tape tension), the output of secondary coil 104 is 0.13 volts and 180° out of phase with the primary. Oscillator output 110, 180° out of phase with output 103, turns transistor 114 on and transistor 116 off on the positive half of its cycle. Transistor 116 is turned on and transistor 114 is turned off on the negative half of the cycle of output 110. The output of secondary coil 104 modulates the current flowing in transistors 114 and 116, and the switching of transistors 114 and 116 is synchronous with the modulated current. For example, if the differential output is negative when output 103 to the primary coil 100 is positive, transistor 116 is on and transistor 114 is off. Therefore, the current of transistor 116 is decreased from the bias level and the current in 114 is zero. On the negative half of the primary voltage cycle; the current in transistor 114 is increased from the bias level and the current in transistor 116 is off.

The currents in transistors 114 and 116 are filtered by capacitors 120, 112 and input to differential amplifier 124. The DC output of amplifier 124 is proportional to the AC output of the differential transformer 94 and the polarity of the output of amplifier 124 corresponds to the phase of the differential transformer output signal. The gain of amplifier 124 is set by resistor 125. Thus, it is seen that the tension amplifier 70 of FIG. 2 is formed by the circuit of transistors 108, 114, 116 and amplifier 124 of FIG. 3.

The output 128 of amplifier 124 is fed to a second summing amplifier 126 which forms the loop compensation circuitry 78. The DC reference voltage 76 is also input between amplifiers 126 and 124. A resistor 130 and a capacitor 132 are connected across amplifier 126 and are in turn connected to the power supply through a potentiometer 134 which permits tape tension adjustment. Resistor 130, and potentiometer 134 set the gain of amplifier 126 and capacitor 132 provides loop stability and prevents oscillation. The gain provided by amplifier 126 controls the current output of motor driver circuit 82. A wide variety of operational amplifiers may be used as amplifiers 124 and 126 in accordance with the operating parameters of the circuitry.

The output 136 of amplifier 126 is connected to motor driver circuit 82 which comprises transistors 140 and 142 connected in a Darlington emitter configuration for high current gain. A diode 144 is included in the circuit to preclude the possibility of current reversal and a resistor 146 is added to the positive power supply to provide a small minimum current to motor 132 under all conditions. These precautions assure that the tape will not fall off the guides or reels when the power is turned on or off or under other abnormal conditions. A biasing resistor 148 is also included in the motor driver circuit. Motor driver circuit 82 is capable of driving current into a negative voltage when the motor is turning in a direction opposite to that in which it is torquing at high tape speeds.

Figure 4:
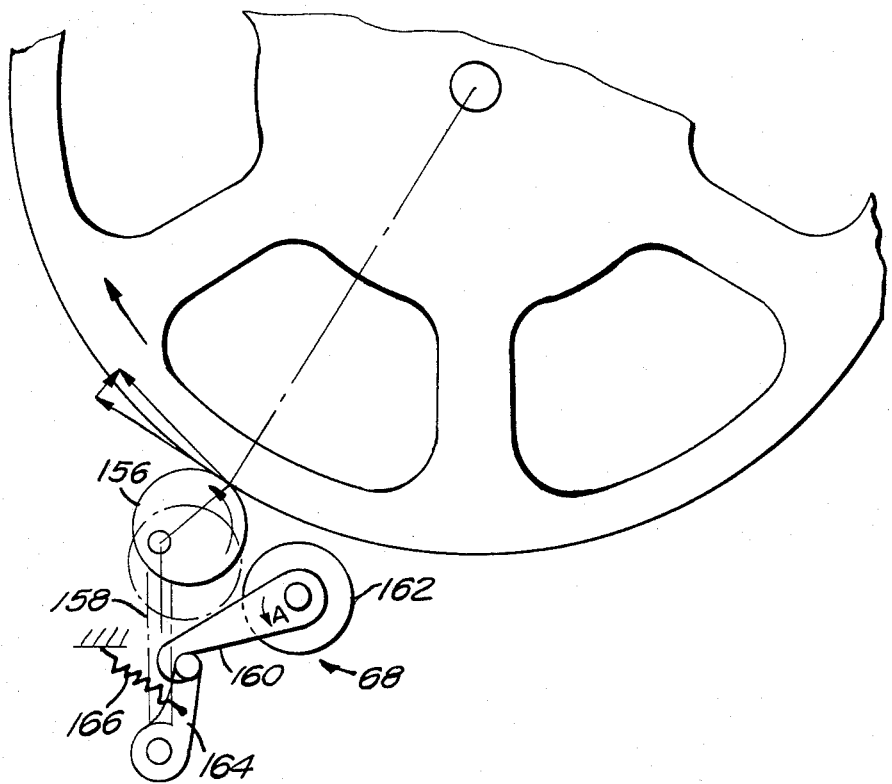
FIG. 4 is a diagram of the reel brake system.

It is apparent that in any system utilizing electrical means, such as a motor, to provide tape tensioning, the system will be inoperative when the power to the system is removed. Accordingly, reel brake 68 is provided to prevent rotation of the reels and to provide tension when the power is removed. FIG. 4 illustrates reel brake 68 in detail. Reel brake 68 includes a cam 156 of resilient material which is disposed proximate to the edges of take-up reel 14 and supply reel 12 so that it may be displaced into engagement therewith to prevent rotation of reels 12, 14. Cam 156 is eccentrically mounted about a pin which is coupled to a lever 158. Lever 158, in turn, is coupled through levers 164, 160 to a motor 162 under the control of electronics 58. When control electronics 58 is energized, motor 162 will be rotated in direction A which will displace cam 156 away from the edges of reels 12, 14 by eccentric rotation, as shown in FIG. 4. Thus, when the system is powered, reel brake 68 will have no affect on tape motion. A latch mechanism 164 limits the rotation of motor 162. When motor 162 is unpowered, a return spring 166 displaces shaft 158 and cam 156 into engagement with reels 12, 14 and the tangential force transmitted to the reels 12, 14 will prevent rotation and induce tension in web 10. Thus, it is seen that when the tape drive system is unpowered, the reel brake will prevent rotation of reels 12, 14. A solenoid may be used in place of motor 162; but for low power requirements, a motor is more efficient.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A compact, low power reel drive web tensioning system comprising:
    (a) a first rotatably mounted supply reel;
    (b) a second rotatably mounted reel;
    (c) differential gear means coupled to said first and second reels to permit counter-rotation of said reels at different speeds;
    (d) a variable torque motor coupled to said differential gear means for rotating said first and second reels;
    (e) inductive transducer means for sensing the tension in said web, said transducer means being adapted to engage the tape and provide an output corresponding to the tension in said tape; and
    (f) servo-control means having an input connected to the output of said transducer means and an output connected to said motor for controlling same, said servo-control means varying the output supplied to said motor to vary the torque of said motor to maintain constant tension on said web.

2. The tensioning system as claimed in claim 1 further including power supply means and reel brake means connected to said power supply means, said reel brake means including means for engaging said first and second reels to prevent their rotation when the power to the power supply means is removed.

3. The tensioning system as claimed in claim 2 wherein said means for engaging said reels comprises a cam eccentrically displaceable from a first position in engagement with said reels to a second position out of engagement with said reels and means for displacing said cam from said first to said second position.

4. The tensioning system as claimed in claim 3 further including mechanical biasing means for actively biasing said cam into said first position.

5. The tensioning system as claimed in claim 1 wherein said inductive transducer means for sensing the tension in said web includes a differential transformer having a displaceable plunger constructed and arranged to engage said web and the displacement of said plunger being dependent on the tension in said web.

6. The tensioning system as claimed in claim 1 wherein said servo-control means includes means for comparing the output of said tension sensing means with a reference voltage.

7. The tensioning system as claimed in claim 1 wherein said servo-control means includes current driver means for providing a varying current to control the torque of said motor means.

8. The tensioning system as claimed in claim 1 further including manual means connected to said servo-control means for setting the tension in said web to a predetermined level.

9. The tensioning system as claimed in claim 1 wherein said reels are coaxially mounted and said differential means are disposed between said first and said second reels.

10. The tensioning system as claimed in claim 1 wherein said inductive transducer means comprises a differential transformer including a displaceable core and a primary coil and a secondary coil including two differentially connected halves, high frequency oscillator means connected to said primary coil of said transformer and said core differentially coupling said primary coil to said halves of said secondary coil as said core is displaced.

11. The tensioning system as claimed in claim 10 further including synchronous detector means connected to one half of said secondary coil to amplitude and phase detect the signal in said half of said secondary coil.

12. A compact, low power reel drive web tensioning system comprising:
    (a) a first rotatably mounted supply reel;
    (b) a second rotatably mounted reel;
    (c) differential gear means coupled to said first and second reels to permit counter-rotation of said reels at different speeds;
    (d) a variable torque motor coupled to said differential gear means for rotating said first and second reels;
    (e) inductive transducer means adapted to engage the tape for sensing the tension in said tape;
    (f) synchronous detector means connected to the output of said inductive transducer means;
    (g) oscillator means electrically connected to the input of said inductive transducer means and to said synchronous detector means for providing oscillating signals thereto, said synchronous detector means being adapted to detect the amplitude and phase of the output of said transducer means relative to the signal supplied to said synchronous detector by said oscillator means; and
    (h) servo-control means having an input connected to the output of said synchronous detector means and an output connected to said motor, said servo control means varying the output to said motor to control the torque of said motor to maintain constant tension on said tape.

13. The reel drive web tensioning system according to claim 12, wherein said oscillator means comprise high frequency oscillating means.

14. The reel drive tensioning system according to claim 13, wherein said synchronous detector means include a pair of differentially connected balancing transistors connected to a voltage source and to a current modulating transistor, the base of said modulating transistor being electrically connected with said output of said transducer means, and the base of at least one of said balancing transistors being electrically connected to said oscillator means.

15. The reel drive web tensioning system according to claim 12, wherein said oscillator means are adapted to supply a first oscillating signal to said transducer means and a second oscillating signal to said synchronous detector means, said second signal being out of phase with said first signal.

16. The reel drive web tensioning system according to claim 15 wherein the frequency of said first and second oscillating signals is about 280 KHZ.

* * * * *